Patented May 23, 1933

1,910,816

UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

VULCANIZATION OF RUBBER AND PRODUCT OBTAINED THEREBY

No Drawing.    Application filed March 6, 1930.  Serial No. 433,798.

The present invention relates to the vulcanization of rubber and similar materials such as gutta percha, balata and the like. The invention is particularly directed to an improvement in the vulcanization of natural rubber wherein one of a preferred class of materials activiated in the manner as hereinafter set forth is employed as an accelerator of the vulcanization process.

It is well known that mercaptobenzothiazole is an accelerator of the rubber vulcanization process. Furthermore it has been shown in a co-pending application, Serial No. 429,217, filed February 17th, 1930, that the accelerating properties of this material are greatly improved by combining a mercaptobenzothiazole with an amino substituted diphenyl amine. It has now been found that the accelerating properties of a reaction product of an unsaturated base such as an aromatic amine with a mercaptobenzothiazole is greatly improved by employing such product as one component of a mixed accelerator in conjunction with a basic organic nitrogen containing vulcanization accelerator as an activator thereof.

One method whereby a mercaptobenzothiazole derivative employed as one of the components of the preferred accelerating composition for example a reaction product of mercaptobenzothiazole and p,p' diamino diphenyl methane was prepared, is as follows. A quantity of mercaptobenzothiazole and p,p' diamino diphenyl methane in the ratio of substantially two molecular proportions of the former to one of the latter were heated together until liquidation was effected after which agitation was continued until a uniform product was obtained. The product thus formed on cooling was a gray crystalline material. If convenient or desirable, the reaction product of mercaptobenzothiazole and p,p' diamino diphenyl methane may be prepared in the presence of an organic solvent, for example ethyl alcohol.

The material thus prepared was sufficiently pure to be capable of use as a vulcanization accelerator without further treatment. Thus a rubber stock was compounded in the usual manner comprising

| | |
|---|---|
| 100 | parts of pale crepe rubber |
| 5 | parts of zinc oxide |
| 3 | parts of sulfur |
| 2 | parts of stearic acid |
| 0.75 | parts of the accelerator described. |

The above stock, after vulcanization by heating in a press in the well known manner for different periods of time at the temperature of 40 pounds of steam pressure per square inch, was found on testing to possess the following tensile characteristics.

*Table I*

| Time of cure | Modulus of elasticity in lbs/in² at elongations of | | | Tensile at break in lbs/in² | Ultimate elongation per cent |
|---|---|---|---|---|---|
| | 300% | 500% | 700% | | |
| 10 minutes | 178 | 387 | 1335 | 2670 | 830 |
| 20 minutes | 227 | 574 | 2140 | 3145 | 770 |
| 30 minutes | 266 | 750 | 2730 | 3560 | 750 |
| 45 minutes | 289 | 774 | 2795 | 3530 | 755 |

The data set forth in Table I shows that the reaction product of mercaptobenzothiazole and p,p' diamino diphenyl methane possesses desirable accelerating action. However, the accelerating properties of this product are substantially increased by the addition thereto of a basic organic nitrogen containing accelerator, as for example diphenyl guanidine as an activator thereof. Thus a rubber stock was compounded comprising

```
100   parts of pale crepe rubber
  5   parts of zinc oxide
  3   parts of sulfur
  2   parts of stearic acid
  0.3 parts of the reaction product of mercaptobenzothiazole and
      p,p' diamino diphenyl methane hereinbefore described
  0.3 parts of diphenyl guanidine.
```

Upon curing and testing the vulcanized rubber product, the tensile data tabulated in Table II were obtained.

*Table II*

| Cure | | Modulus of elasticity in lbs/in² at elongations of | | | Tensile at break lbs/in² | Ultimate elongation per cent |
|---|---|---|---|---|---|---|
| Time | Lbs. steam pressure | 300% | 500% | 700% | | |
| 10 minutes | 40 | 148 | 379 | 1430 | 2515 | 800 |
| 20 minutes | 40 | 271 | 833 | 3135 | 3455 | 745 |
| 30 minutes | 40 | 318 | 1043 | 3790 | 3935 | 710 |
| 45 minutes | 40 | 364 | 1070 | ------ | 3780 | 690 |

It is thus shown from the data hereinbefore set forth that the reaction product of mercaptobenzothiazole and p,p' diamino diphenyl methane itself is a very desirable and effective accelerator, whose accelerating properties are greatly improved by the addition thereto of an organic nitrogen containing basic accelerator, as an activator thereof. The accelerating power of the mixture of accelerators is greater than is that of either of its components as is evident from the results set forth in Table II wherein 25% less by weight of accelerator was employed in the stock than was used in the first example.

Another example of the preferred class of accelerators is a reaction product of beta naphthylamine and mercaptobenzothiazole which material is employed preferably in conjunction with an organic nitrogen containing basic accelerator. However, if desirable, this product itself may be employed alone as an accelerator of the vulcanization process.

A reaction product of beta naphthylamine and mercaptobenzothiazole was prepared by heating substantially equi-molecular proportions of these materials until the reactants were entirely liquid. On cooling, the product solidified to produce a gray material. The following example is illustrative of the use of the reaction product of beta naphthylamine and mercaptobenzothiazole alone as a vulcanization accelerator. A rubber stock was compounded in the usual manner comprising

```
100   parts of pale crepe rubber
  5   parts of zinc oxide
  3   parts of sulfur
  2   parts of stearic acid
  0.75 parts of the accelerator described.
```

After vulcanizing the compound rubber stock and testing the cured rubber product, the tensile data set forth in Table III were obtained.

*Table III*

| Cure | | Modulus of elasticity in lbs/in² at elongations of | | | Tensile at break lbs/in² | Ultimate elongation, per cent |
|---|---|---|---|---|---|---|
| Time | Lbs. steam pressure | 300% | 500% | 700% | | |
| 10 minutes | 40 | 127 | 209 | 586 | 1790 | 900 |
| 20 minutes | 40 | 180 | 340 | 1210 | 2473 | 835 |
| 30 minutes | 40 | 191 | 417 | 1585 | 2875 | 800 |
| 45 minutes | 40 | 224 | 523 | 2000 | 3155 | 770 |
| 60 minutes | 40 | 263 | 614 | 2230 | 3235 | 775 |

It is preferred that the reaction product of beta naphthylamine and mercaptobenzothiazole be employed in conjunction with a basic organic nitrogen containing accelerator as an activator thereof. A rubber stock was milled in the usual way comprising

```
100   parts of pale crepe rubber
  5   parts of zinc oxide
  3   parts of sulfur
  2   parts of stearic acid
   .3 parts of reaction product of beta naphthylamine and mercapto-
      benzothiazole
   .3 parts of diphenyl guanidine.
```

The compounded rubber stock was then vulcanized and the vulcanized rubber product tested in the usual manner. The vulcanized rubber was found to possess the tensile data given in Table IV

*Table IV*

| Cure | | Modulus of elasticity in lbs./in.² at elongations of | | | Tensile at break lbs./in.² | Ultimate elongation, per cent |
|---|---|---|---|---|---|---|
| Time | Lbs. steam pressure | 300% | 500% | 700% | | |
| 10 minutes | 40 | 168 | 352 | 1340 | 2490 | 820 |
| 20 minutes | 40 | 203 | 681 | 2790 | 3500 | 740 |
| 30 minutes | 40 | 290 | 874 | 3415 | 3800 | 750 |

The data set forth in Table IV shows further that the preferred class of accelerators when activated by a basic organic nitrogen containing accelerator comprise a group of accelerating compounds of exceptional merit in that 20% less by weight of accelerator brought about a faster cure and produced a product of higher quality.

A reaction product of diphenyl amine and mercaptobenzothiazole was prepared by heating together substantially equi-molecular proportions of these substances until the resulting product was liquid. The product thus obtained, on cooling, was a brittle solid, which upon grinding produced a dark gray powder. This material has been employed alone as a vulcanization accelerator, but preferably is employed in conjunction with a basic organic nitrogen containing accelerator as an activator thereof.

A rubber stock was compounded comprising 100   parts of pale crepe rubber
      5   parts of zinc oxide
      3   parts of sulfur
      2   parts of stearic acid
    .75   parts of the reaction product of diphenyl amine and mercaptobenzothiazole.

On heating the compounded stock in a press in the usual manner for different periods of time at 40 pounds steam pressure, the reaction product was found to accelerate the vulcanization process. It is preferable, however, that this material be employed in conjunction with a basic organic nitrogen containing accelerator to form a mixed accelerator. Thus a rubber stock was compounded comprising 100   parts of pale crepe rubber
      5   parts of zinc oxide
      3   parts of sulfur
      2   parts of stearic acid
    0.3   parts of the reaction product of diphenyl amine and mercaptobenzothiazole
    0.3   parts of diphenyl guanidine.

After vulcanizing and testing the cured rubber product, it was found to possess the tensile properties given in Table V.

Table V

| Cure | | Modulus of elasticity in lbs/in² at elongations of | | | Tensile at break lbs/in² | Ultimate elongation per cent |
|---|---|---|---|---|---|---|
| Time | Lbs. steam pressure | 300% | 500% | 700% | | |
| 10 minutes | 40 | 102 | 326 | 1035 | 2100 | 840 |
| 20 minutes | 40 | 237 | 643 | 2415 | 3160 | 740 |
| 30 minutes | 40 | 305 | 805 | 3200 | 4080 | 755 |

The data given in Table V shows conclusively the desirable accelerating properties of the preferred class of accelerating materials in that a cured rubber product of high quality was produced. Furthermore, the accelerator is fast in its action since a good cure was obtained after ten minutes, heating at the temperature employed while particularly desirable results were obtained in thirty minutes.

Another of the preferred type of materials was prepared by heating para phenylene diamine and mercaptobenzothiazole in the ratio of substantially one molecular proportion of the former to two of the latter until liquidation of the reacting substances was effected. On allowing to cool, a gray crystalline product was obtained which could be ground readily. The reaction product prepared as described was milled into a rubber stock comprising 100   parts of pale crepe rubber
      5   parts of zinc oxide
      3   parts of sulfur
      2   parts of stearic acid
    .75   parts of reaction product of para phenylene diamine and mercaptobenzothiazole.

On vulcanizing the compounded rubber stock by heating in a press for 30 minutes at 40 pounds of steam pressure per square inch, a cured rubber product was obtained possessing a tensile at break of 3735 pounds per square inch and an ultimate elongation of 735%.

The reaction product of p-phenylene diamine and mercaptobenzothiazole has been employed in a rubber stock in conjunction with a basic organic nitrogen containing vulcanization accelerator, for example diphenyl guanidine, and on testing the compounded rubber stock in the well known manner, the mixed accelerator was found to possess accelerating qualities comparable to those hereinbefore set forth.

Another example of the preferred class of compounds that is employed preferably in conjunction with a basic organic nitrogen containing accelerator as an activator thereof is a reaction product of mercaptobenzothiazole and 2,4 diamino diphenyl amine and preferably a product formed by reacting substantially three molecular proportions of mercaptobenzothiazole with substantially one molecular proportion of 2,4 diamino diphenyl amine. As one method of employing such reaction product, a rubber tread stock was compounded in the usual manner comprising 100    parts of pale crepe rubber
     40    parts of carbon black
     10    parts of zinc oxide
      2    parts of stearic acid
    1.75   parts of a blended mineral oil and rosin
    3.0    parts of sulfur
    .45    parts of the accelerator described above
    .30    parts of diphenyl guanidine.

The rubber stock thus formed was vulcanized by heating in a press for different periods of time at different steam pressures. On testing, the vulcanized rubber product was found to possess the modulus and tensile properties as set forth in Table VI.

Table VI

| Cure | | Modulus of elasticity in lbs/in² at elongations of | | Tensile at break lbs/in² | Ultimate elongation per cent |
|---|---|---|---|---|---|
| Time | Lbs. steam pressure | 300% | 500% | | |
| 45 minutes | 10 | 805 | 2225 | 3095 | 620 |
| 60 minutes | 10 | 1000 | 2695 | 4000 | 660 |
| 90 minutes | 10 | 1278 | 3275 | 4855 | 670 |
| 30 minutes | 20 | 1200 | 3000 | 4445 | 675 |
| 45 minutes | 20 | 1500 | 3550 | 4890 | 650 |
| 60 minutes | 20 | 1655 | 3960 | 5155 | 640 |
| 90 minutes | 20 | 1980 | 4280 | 5020 | 630 |
| 120 minutes | 20 | 2040 | 4440 | 5260 | 595 |

The data as set forth in Table VI shows that the preferred class of accelerating compounds when activated by a basic organic nitrogen containing accelerator possess exceptionally desirable accelerating qualities. From the above data it is apparent that the compounded rubber stock is well cured at lower steam pressures and not over cured on continued heating under vulcanizing conditions.

Anhydro formaldehyde aniline and thiocarbanilide have also been employed among others, in conjunction with the reaction product of an aromatic amine and a mercaptobenzothiazole to form a mixed accelerator and as an activator thereof. Thus, a rubber tread stock was compounded comprising

```
100    parts of smoked sheet rubber
 40    parts of carbon black
 10    parts of zinc oxide
  2    parts of stearic acid
  1.75 parts of a blended mineral oil and rosin
  3    parts of sulfur
   .875 parts of anhydro formaldehyde aniline
   .375 parts of the reaction product of substantially three molecular
        proportions of mercaptobenzothiazole and substantially
        one molecular proportion of 2,4 diamino diphenyl amine.
```

On vulcanizing and testing the vulcanized rubber product, the tensile data given in the following table were obtained.

Table VII

| Cure | | Modulus of elasticity in lbs/in$^2$ at elongations of | | | Tensile at break in lbs/in$^2$ | Ultimate elongation, per cent |
|---|---|---|---|---|---|---|
| Time | Lbs. steam pressure | 300% | 500% | 700% | | |
| 45 minutes | 10 | 435 | 1333 | 2480 | 2625 | 730 |
| 60 minutes | 10 | 616 | 1845 | | 2920 | 650 |
| 90 minutes | 10 | 964 | 2635 | | 4305 | 685 |
| 30 minutes | 20 | 702 | 1915 | | 3040 | 675 |
| 45 minutes | 20 | 985 | 2630 | | 4050 | 680 |
| 60 minutes | 20 | 1160 | 2980 | | 4425 | 655 |
| 90 minutes | 20 | 1455 | 3395 | | 4920 | 670 |
| 120 minutes | 20 | 1705 | 3715 | | 4965 | 645 |

A stock identical with that described above, with the exception that thiocarbanilide was employed as a basic organic nitrogen containing activator accelerator in place of anhydro formaldehyde aniline, was also compounded and the mixed vulcanization accelerator thus employed therein likewise was found to possess desirable accelerating properties. The tensile data obtained on testing the vulcanized rubber product are given in Table VIII.

Table VIII

| Cure | | Modulus of elasticity in lbs/in$^2$ at elongations of | | Tensile at break in lbs/in$^2$ | Ultimate elongation, per cent |
|---|---|---|---|---|---|
| Time | Lbs. steam pressure | 300% | 500% | | |
| 45 minutes | 10 | 855 | 2305 | 3810 | 690 |
| 60 minutes | 10 | 855 | 2445 | 3860 | 680 |
| 90 minutes | 10 | 1090 | 2800 | 4370 | 670 |
| 30 minutes | 20 | 850 | 2505 | 3940 | 690 |
| 45 minutes | 20 | 1055 | 2750 | 4245 | 680 |
| 60 minutes | 20 | 1275 | 3200 | 4620 | 685 |
| 90 minutes | 20 | 1425 | 3405 | 4665 | 655 |
| 120 minutes | 20 | 1535 | 3610 | 4850 | 635 |

As still further examples showing the use of the preferred class of accelerators, di ortho tolyl guanidine, tri phenyl guanidine, hexamethylene tetramine, the formaldehyde derivative of the reaction product of substantially three molecular proportions of acetaldehyde and substantially two molecular proportions of aniline, di ortho tolyl thiourea, meta toluene diamine, and triphenyl biguanide among others have been employed as basic organic nitrogen activator accelerators in conjunction with the reaction product of substantially three molecular proportions of mercaptobenzothiazole and substantially one molecular proportion of 2,4 diamino diphenyl amine as a mixed accelerator in a rubber stock. Rubber stocks were compounded comprising

```
100   parts of pale crepe rubber
  5   parts of zinc oxide
  3   parts of sulfur
  0.4 parts of the reaction product of substantially three
      molecular proportions of mercaptobenzothiazole
      and substantially one molecular proportion of
      2,4 diamino diphenyl amine
  0.6 parts of each of the basic activator accelerators
      given above.
```

The different rubber stocks thus formed were vulcanized by heating in a press in a well known manner and the vulcanized rubber products thus formed were tested, and found to possess the modulus and tensile figures given in Table IX which follows. In Table IX, in order to differentiate between the various basic organic nitrogen containing activator accelerators employed in the otherwise identical stocks the following description is employed:

Accelerator A is di ortho tolyl guanidine.
Accelerator B is triphenyl guanidine.
Accelerator C is hexamethylene tetramine.
Accelerator D is the formaldehyde derivative of the reaction product of substantially three molecular proportions of acetaldehyde and substantially two molecular proportions of aniline.
Accelerator E is di ortho tolyl thiourea.
Accelerator F is meta toluene diamine.
Accelerator G is triphenyl biguanide.

All the foregoing products designated as A to G respectively, were compounded as activators of the accelerator of the preferred type as set forth in the compounding recipe.

Table IX

| Cure | | Basic activator accelerator | Modulus of elasticity in lbs/in$^2$ at elongations of | | | Tensile at break in lbs/in$^2$ | Ultimate elongation per cent |
|---|---|---|---|---|---|---|---|
| Time, minutes | Lbs. steam pressure | | 300% | 500% | 700% | | |
| 30 | 20 | A | 374 | 1500 | 4750 | 5150 | 715 |
| 30 | 20 | B | 242 | 770 | 2730 | 3860 | 760 |
| 30 | 20 | C | 319 | 1145 | 3920 | 4415 | 730 |
| 30 | 20 | D | 234 | 773 | 2760 | 4140 | 785 |
| 30 | 20 | E | 187 | 607 | 2125 | 3675 | 810 |
| 30 | 20 | F | 183 | 540 | 1920 | 3765 | 830 |
| 30 | 20 | G | 294 | 1315 | | 4175 | 695 |
| 45 | 20 | A | 527 | 2285 | | 4265 | 620 |
| 45 | 20 | B | 265 | 921 | 3235 | 4325 | 760 |
| 45 | 20 | C | 362 | 1440 | 4480 | 4695 | 705 |
| 45 | 20 | D | 238 | 930 | 3195 | 4260 | 760 |
| 45 | 20 | E | 224 | 661 | 2310 | 3770 | 800 |
| 45 | 20 | F | 208 | 630 | 2275 | 3910 | 800 |
| 45 | 30 | G | 407 | 1690 | | 4875 | 695 |
| 60 | 20 | A | 530 | 2350 | | 4520 | 630 |
| 60 | 20 | B | 301 | 1005 | 3610 | 4600 | 760 |
| 60 | 20 | C | 368 | 1480 | 4640 | 5175 | 735 |
| 60 | 20 | D | 248 | 950 | 3480 | 4335 | 750 |
| 60 | 20 | E | 184 | 625 | 2320 | 3900 | 800 |
| 60 | 20 | F | 212 | 700 | 2520 | 3800 | 790 |
| 60 | 20 | G | 400 | 1860 | | 5115 | 695 |

From the data set forth in the foregoing table, it is apparent that the preferred class of materials constitute an important class of rubber vulcanization accelerators which produce a high quality rubber stock when employed alone but particularly when employed in the presence of an activator of basic nature.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds, and are apparent to those skilled in the art to which this invention pertains. The present invention is limited solely by the following claims wherein the invention is claimed as broadly as possible in view of the prior art.

What is claimed is:

1. The process of vulcanizing rubber which comprises heating rubber and sulfur in the presence of an accelerator comprising a reaction product of an aromatic amine and a mercaptobenzothiazole, said accelerator being activated during the vulcanization process by a basic organic nitrogen containing activating vulcanization accelerator.

2. The process of vulcanizing rubber which comprises heating rubber and sulfur in the presence of an accelerator comprising a reaction product of an aromatic primary amine and a mercaptobenzothiazole, said accelerator being activated during the vulcanization process by a basic organic nitrogen containing activating vulcanization accelerator.

3. The process of vulcanizing rubber which comprises heating rubber and sulfur in the presence of an accelerator comprising a reaction product of an aromatic primary diamino compound and a mercaptobenzothiazole, said accelerator being activated during the vulcanization process by a basic organic nitrogen containing vulcanization accelerator.

4. The process of vulcanizing rubber which comprises heating rubber and sulfur in the presence of an accelerator comprising a reaction product of 2,4 diamino diphenyl amine and mercaptobenzothiazole, said accelerator being activated during the vulcanization process by a guanidine accelerator.

5. The process of vulcanizing rubber which comprises heating rubber and sulfur in the presence of an accelerator comprising a reaction product of substantially one molecular proportion of 2,4 diamino diphenyl amine and substantially three molecular proportions of mercaptobenzothiazole, said accelerator being activated during the vulcanization process by diphenyl guanidine.

6. The vulcanized rubber product prepared by heating rubber and sulfur in the presence of an accelerator comprising a reaction product of an aromatic amine and a mercaptobenzothiazole, said accelerator being activated during the vulcanization process by a basic organic nitrogen containing vulcanization accelerator.

7. The vulcanized rubber product prepared by heating rubber and sulfur in the presence of an accelerator comprising a reaction product of an aromatic primary amine and a mercaptobenzothiazole, said accelerator being activated during the vulcanization process by a basic organic nitrogen containing vulcanization accelerator.

8. The vulcanized rubber product prepared by heating rubber and sulfur in the presence of an accelerator comprising a reaction product of an aromatic primary diamino compound and a mercaptobenzothiazole, said accelerator being activated during the vulcanization process by a basic organic nitrogen containing vulcanization accelerator.

9. The vulcanized rubber product prepared by heating rubber and sulfur in the presence of an accelerator comprising a reaction product of 2,4 diamino diphenyl amine and mercaptobenzothiazole, said accelerator being activated during the vulcanization process by a guanidine accelerator.

10. The vulcanized rubber product prepared by heating rubber and sulfur in the presence of an accelerator comprising a reaction product of substantially one molecular proportion of 2,4 diamino diphenyl amine and substantially three molecular proportions of mercaptobenzothiazole, said accelerator being activated during the vulcanization process by diphenyl guanidine.

In testimony whereof I hereunto affix my signature.

ROBERT L. SIBLEY.